US012633826B2

(12) United States Patent
Iorga et al.

(10) Patent No.: US 12,633,826 B2
(45) Date of Patent: May 19, 2026

(54) DC-DC CONVERTER WITH SWITCHING NOISE SUPPRESSION CIRCUITRY

(71) Applicant: Rambus Inc., San Jose, CA (US)

(72) Inventors: Cosmin Iorga, Beaverton, OR (US); Panduka Wijetunga, Newbury Park, CA (US)

(73) Assignee: Rambus Inc., San Jose, CA (US)

( * ) Notice: Subject to any disclaimer, the term of this patent is extended or adjusted under 35 U.S.C. 154(b) by 192 days.

(21) Appl. No.: 18/412,966

(22) Filed: Jan. 15, 2024

(65) Prior Publication Data

US 2024/0243662 A1 Jul. 18, 2024

Related U.S. Application Data

(60) Provisional application No. 63/439,455, filed on Jan. 17, 2023.

(51) Int. Cl.
| | |
|---|---|
| H02M 1/00 | (2007.01) |
| H02M 3/157 | (2006.01) |
| H02M 3/158 | (2006.01) |

(52) U.S. Cl.
CPC ......... H02M 3/157 (2013.01); H02M 1/0019 (2021.05); H02M 1/0025 (2021.05); H02M 1/0064 (2021.05)

(58) Field of Classification Search
CPC .. H02M 1/0019; H02M 1/0025; H02M 1/123; H02M 1/44; H02M 1/0009; H02M 1/32; H02M 3/158
See application file for complete search history.

(56) References Cited

U.S. PATENT DOCUMENTS

| | | | |
|---|---|---|---|
| 7,796,365 B2 | 9/2010 | Isham | |
| 9,035,639 B2 | 5/2015 | Drinovsky | |
| 10,348,185 B1 * | 7/2019 | Michal | H02M 3/33507 |
| 10,945,322 B1 * | 3/2021 | Xiong | H05B 45/382 |
| 10,952,299 B1 * | 3/2021 | Xiong | H02M 1/0058 |
| 11,122,668 B1 * | 9/2021 | Xiong | H05B 45/382 |
| 2007/0274015 A1 * | 11/2007 | Isham | H02H 7/1227 |
| | | | 361/93.1 |
| 2008/0031020 A1 * | 2/2008 | Lee | H02M 3/156 |
| | | | 363/40 |
| 2015/0188351 A1 * | 7/2015 | Jiang | H02J 7/0029 |
| | | | 320/162 |
| 2017/0353102 A1 * | 12/2017 | Chen | H02M 1/15 |
| 2024/0146186 A1 * | 5/2024 | Kim | H02M 1/44 |
| 2024/0405545 A1 * | 12/2024 | Kim | H02M 1/123 |

* cited by examiner

*Primary Examiner* — Sisay G Tiku
(74) *Attorney, Agent, or Firm* — Lance Kreisman; Peninsula Patent Group

(57) ABSTRACT

A DC-DC converter is disclosed. The DC-DC converter includes a sensing circuit having a first path to sense an output current of the DC/DC converter. A reference circuit generates a reference current to flow along a second path. The reference current is for comparison to the output current. A noise injection circuit couples to the second path and includes a replica circuit of the sensing circuit to sense the reference current. A differential amplifier rejects a common mode noise between the first path and the second path.

15 Claims, 4 Drawing Sheets

FIG. 2

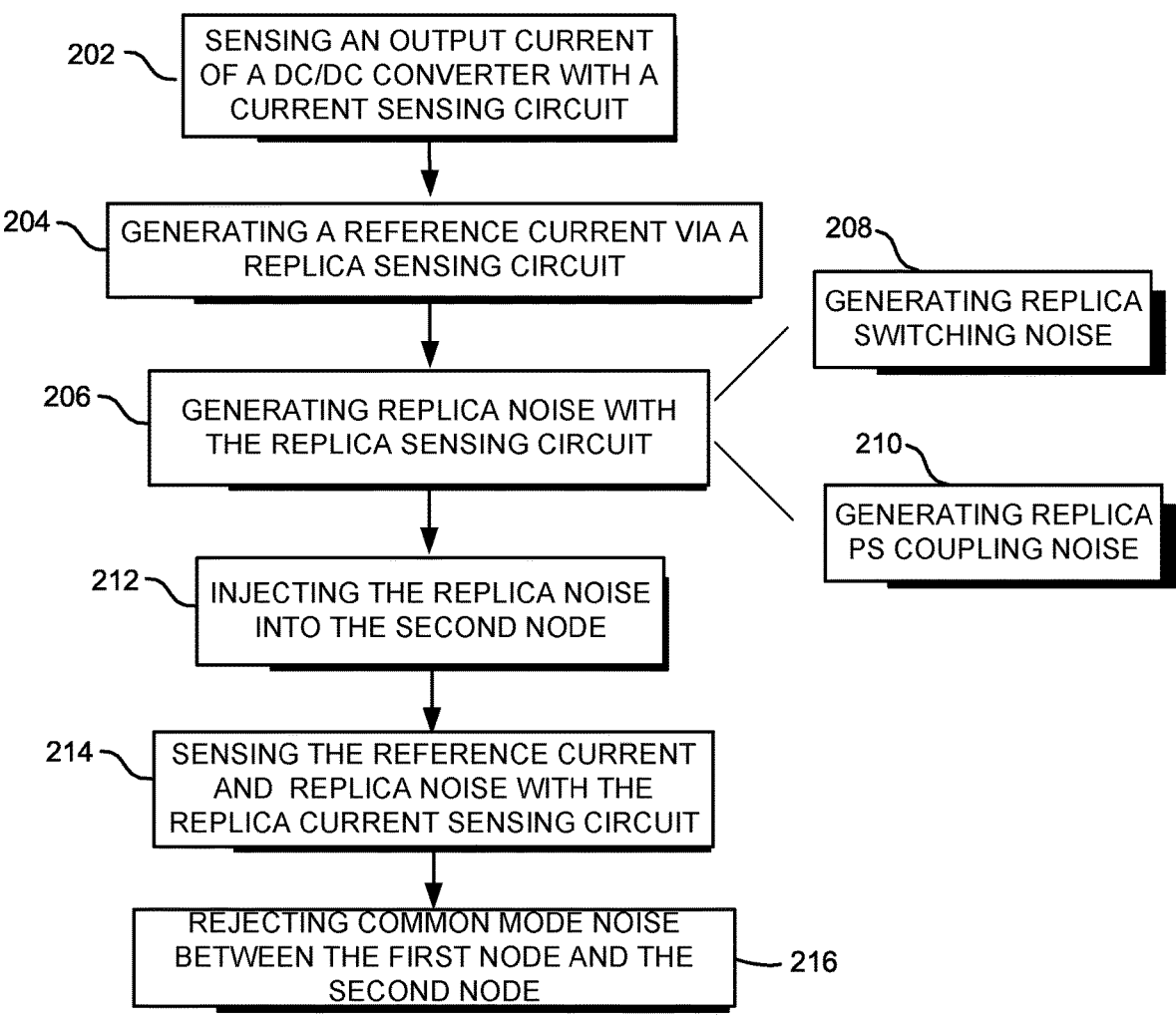

202 — SENSING AN OUTPUT CURRENT OF A DC/DC CONVERTER WITH A CURRENT SENSING CIRCUIT

204 — GENERATING A REFERENCE CURRENT VIA A REPLICA SENSING CIRCUIT

208 — GENERATING REPLICA SWITCHING NOISE

206 — GENERATING REPLICA NOISE WITH THE REPLICA SENSING CIRCUIT

210 — GENERATING REPLICA PS COUPLING NOISE

212 — INJECTING THE REPLICA NOISE INTO THE SECOND NODE

214 — SENSING THE REFERENCE CURRENT AND REPLICA NOISE WITH THE REPLICA CURRENT SENSING CIRCUIT

REJECTING COMMON MODE NOISE BETWEEN THE FIRST NODE AND THE SECOND NODE — 216

FIG. 3

DC-DC CONVERTER WITH SWITCHING NOISE SUPPRESSION CIRCUITRY

CROSS-REFERENCE TO RELATED APPLICATIONS

This application is a Non-Provisional that claims priority to U.S. Provisional Application No. 63/439,455 filed Jan. 17, 2023, entitled DC-DC CONVERTER WITH SWITCHING NOISE SUPPRESSION, which is incorporated herein by reference in its entirety.

TECHNICAL FIELD

The disclosure herein relates to DC-DC converter devices, related methods, systems and modules that employ such devices.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 2 illustrates a high-level flowchart of steps for operating the DC-DC converter of FIG. 1.

FIG. 3 illustrates further detail for one embodiment of the DC-DC converter of FIG. 1

DETAILED DESCRIPTION

Embodiments of DC-DC converters, methods, systems and associated integrated circuit devices are disclosed herein. One embodiment of a DC-DC converter described herein includes a sensing circuit having a first path to sense an output current of the DC/DC converter. A reference circuit generates a reference current to flow along a second path. The reference current is for comparison to the output current. A noise injection circuit couples to the second path and includes a replica circuit of the sensing circuit to sense the reference current. A differential amplifier rejects a common mode noise between the first path and the second path. By including a replica of the sensing circuit in the noise injection circuit, noise components in the first path and the second path may be matched and canceled as common-mode noise by the differential amplifier. Suppressing noise in this fashion may improve the reliability and power-efficiency of the DC-DC converter.

Figure 1:
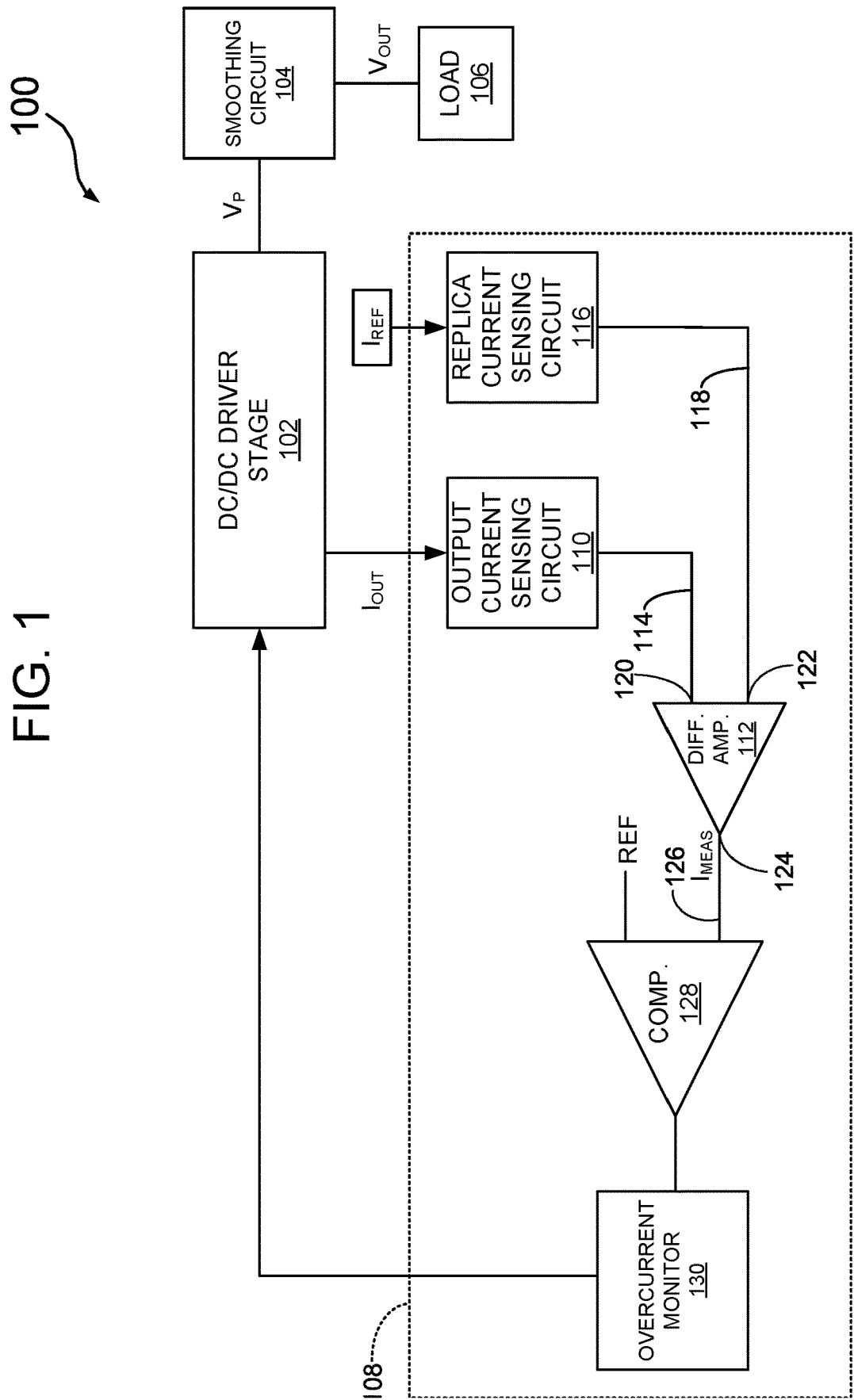
FIG. 1 illustrates one embodiment of a DC-DC converter.

Referring now to FIG. 1, one embodiment of a DC-DC converter, generally designated 100, includes a DC-DC driver stage 102 that incorporates switching elements to transform an input voltage $V_{IN}$ to a switched voltage $V_P$. A smoothing circuit 104 smooths the pulses to a predetermined regulated output voltage $V_{OUT}$. For one embodiment, the smoothing circuit 104 provides off-chip passive circuit elements such as capacitors and inductors to carry out the smoothing. The regulated output voltage $V_{OUT}$ may be fed to a distribution circuit to power one or more loads 106. In certain embodiments, as explained more fully below with respect to FIG. 4, the DC-DC converter 100 may be included in a power management integrated circuit (PMIC) chip that is disposed on a dynamic random access memory (DRAM) module to power multiple DRAM memory devices.

Further referring to FIG. 1, for one embodiment, an on-chip overcurrent protection (OCP) circuit 108 monitors an output current $I_{MEAS}$ associated with the pulsed voltage $V_P$ of the DC-DC driver stage 102. Generally, if the monitored output current $I_{MEAS}$ exceeds a predetermined threshold, indicating an accumulation of current that could cause current ramps or spikes and potentially damage the load circuitry 106, then the OCP circuit 108 shuts off the DC-DC driver stage 102.

In an effort to minimize the effects of noise involved in the OCP circuit 108 operation, and further referring to FIG. 1, one embodiment of the DC-DC converter 100 employs an output current sensing circuit 110 that senses an output current $I_{OUT}$ corresponding to the switched voltage $V_P$ generated by the DC-DC driver stage 102. The sensed output current $I_{OUT}$, along with any noise components associated with the output current sensing circuit 110, is fed to a differential amplifier 112 via a first sense path 114. In some embodiments, the noise components may result from power supply noise coupling and/or switching noise coupling from the operation of active circuitry of the sensing circuit 110. For one embodiment, a replica current sensing circuit 116 is provided in the OCP circuit 108 to generate and sense a known reference current $I_{REF}$. For one embodiment, the replica current sensing circuit 116 employs circuitry that matches the output current sensing circuit 110, and thus exhibits similar noise characteristics as those exhibited by the output current sensing circuit 110. The sensed reference current $I_{REF}$, along with any replica noise components associated with the replica current sensing circuit 116, is fed to the differential amplifier 112 via a replica sense path 118.

For one embodiment, and with continued reference to FIG. 1, the replica current sensing circuit 116 not only replicates the output current sensing circuit 110 structure, but also replicates noise coupling components similar to those that affect the first current sensing circuit 110, such as switching noise and/or power supply noise. Further detail pertaining to one specific embodiment of the replica current sensing circuit 116 is described more fully below and shown in FIG. 3.

Further referring to FIG. 1, the differential amplifier 112 includes a first input, at 120, to receive the sensed output current $I_{OUT}$ and associated output current noise components. A second input, at 122, receives the sensed replica current $I_{REF}$ and associated replica current noise components. The differential amplifier 112 includes an output, at 124, that generates an output signal representing the difference between the signals on the first input 120 and the second input 122. With the noise characteristics of the current sensing circuit 110 and the replica current sensing circuit 116 substantially matched, the respective noise components cancel each other out as common-mode noise by the differential amplifier 112, resulting in minimal impact to the resulting differential amplifier output $I_{MEAS}$. The output signal $I_{MEAS}$ is then presented on an output path 126 to a comparator 128, which compares the output signal $I_{MEAS}$ from the differential amplifier 112 to a reference signal REF. If the output signal $I_{MEAS}$ from the differential amplifier 112 exceeds the reference value REF, then the comparator 128 generates a control signal for an overcurrent monitor 130 to disable power to, or otherwise shut off the DC-DC driver stage 102.

FIG. 2 illustrates a flowchart of steps for one embodiment of a method that may be performed to operate the DC-DC converter 100 in a manner that reduces the effects of various noise components on one or more monitoring circuits. The method involves sensing the output current of the DC-DC converter 100 via the output current sensing circuit 110, at 202. At 204, a reference current is generated by the replica current sensing circuit 116. Replica noise components are also generated by the replica current sensing circuit, at 206. For some embodiments, the generating of the noise includes generating replica switching noise, at 208, that substantially matches the switching noise of the output current sensing circuit 110. Alternatively, or in addition to generating the switching noise, the generating may include generating replica power supply noise, at 210, that substantially matches the power supply noise of the output current sensing circuit 110. The generated reference current and the associated noise components are injected into the replica sensing circuit 116, at 212, and sensed by the replica sensing circuit 116, at 214. The differential amplifier then, at 216, rejects the matching noise components as common-mode noise.

Figure 3:
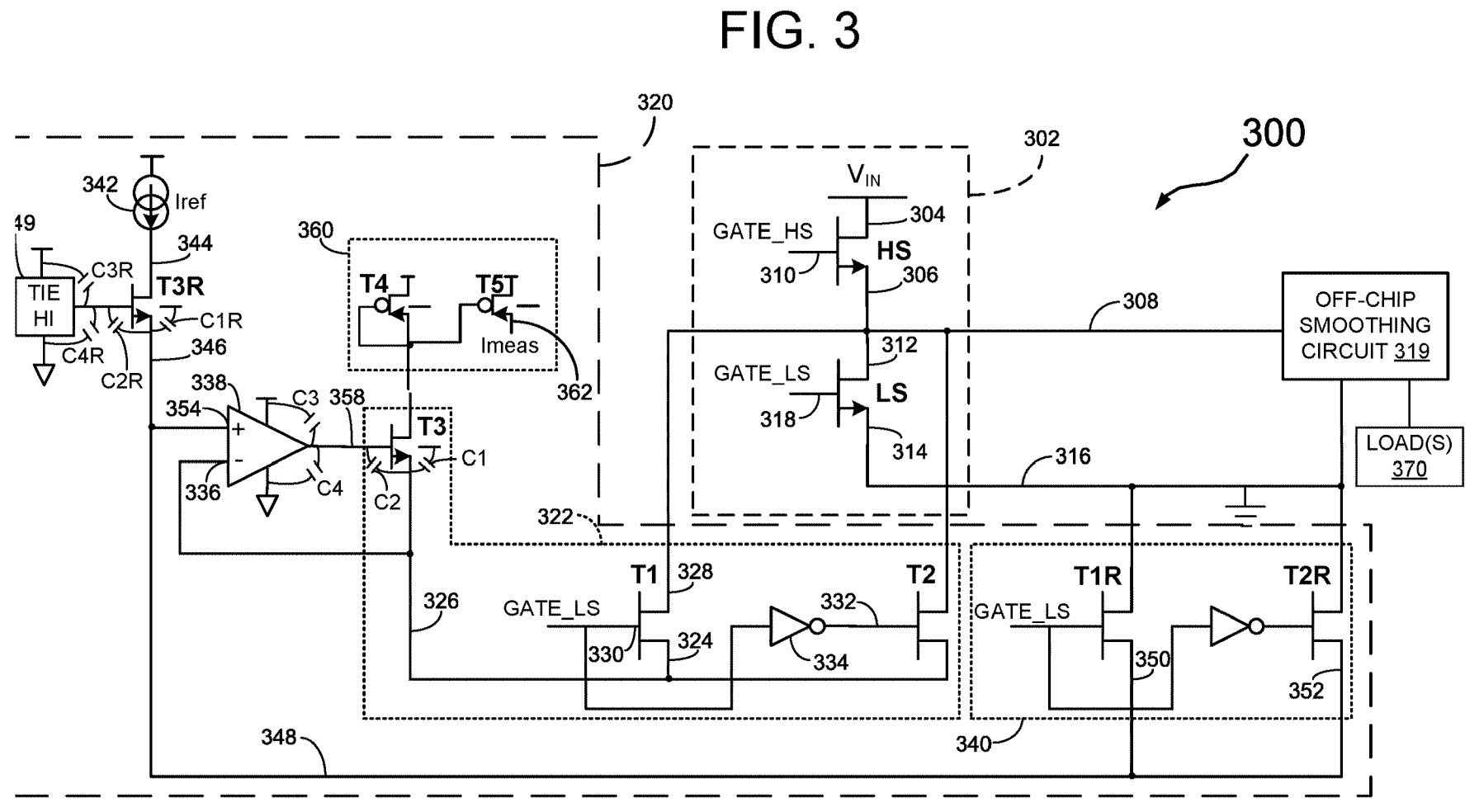

FIG. 3 illustrates one specific embodiment of a DC-DC converter, generally designated 300, that includes most of the circuit features of the DC-DC converter 100 of FIG. 1, but in further detail. The DC-DC converter 300 includes a driver stage 302 that includes respective high and low switching transistors HS and LS arranged in a push-pull configuration. The high switching transistor HS includes a source terminal, at 304, that is coupled to an input voltage $V_{IN}$, and a drain terminal, at 306, that is coupled to an output node 308 of the driver stage 302. A gate terminal of the high-switching transistor HS, at 310, receives a pulsed input signal GATE_HS that is generated by a control circuit (not shown). The low-switching transistor LS includes a source terminal, at 312, that is coupled to the output node 308, and a drain terminal, at 314, that is coupled to a ground node 316. A gate terminal of the low-switching transistor LS, at 318, receives a pulsed input signal GATE_LS that is an inverted version of the GATE_HS signal.

Further referring to FIG. 3, the output node 308 of the driver stage 302 feeds an off-chip smoothing circuit 319. For one embodiment, the off-chip smoothing circuit 319 includes an inductor/capacitor (LC) arrangement of one or more inductors and capacitors that smooths the pulsed output waveform $V_P$ into more of a steady-state DC waveform. In some circumstances, inertia effects associated with the smoothing circuit 319 may create current accumulations in response to receiving the train of pulses associated with the switching voltage $V_P$. The current accumulations may manifest themselves as undesirable current ramps or spikes of various magnitudes, on the order of between 20 mV-150 mV.

With continued reference to FIG. 3, the DC-DC converter 300 employs a noise-suppressed over-current protection (OCP) circuit 320 to shut down operation of the DC-DC converter 300 when a current ramp or spike of a certain threshold is reached or exceeded. The OCP circuit 320 includes an output current sensing circuit 322 to sense the output current flowing through the low-switching transistor LS during a given switch interval. The output current sensing circuit 322 includes a first sensing transistor T1 having a source terminal, at 324, coupled to a low switching sense node 326, and a drain terminal, at 328, coupled to the output current node 308. A gate terminal of the first sensing transistor T1, at 330, receives a copy of the pulsed input signal GATE_LS. The output current sensing circuit 322 also includes a second sensing transistor T2 that matches the first sensing transistor T1 and is disposed in parallel with the first sensing transistor T1, but receives an inverted form of the input pulsed signal GATE_LS at a gate terminal 332 via an inverter 334.

With continued reference to FIG. 3, the low switching sense node 326 feeds the sensed output current of the low switching transistor LS to a first input 336 of a differential amplifier 338. An output of the differential amplifier 338, at 358, provides a gate input to a third current sensing transistor T3 that feeds current to the current sensing circuit node 326 from a current mirror circuit 360. For one embodiment, the current mirror circuit 360 includes P-type transistors T4 and T5 that are arranged to form a current mirror, such that current drawn from transistor T5 is proportional to, or mirrors that drawn from T4 (which feeds transistor T3 into the current sense node 326). A source terminal of transistor T5, at 362, serves as a measuring node for a measured current value that corresponds to the sensed current associated with the low switching transistor LS. For one embodiment, the measuring node 362 is coupled to an input of the comparator 112 (FIG. 1) for comparison to a threshold current value.

For one embodiment, the third current sensing transistor T3 includes a bulk substrate connection, which may be susceptible to power supply noise through parasitic capacitances, indicated by C1 and C2. Similar noise coupling paths are associated with the differential amplifier 338, and indicated by C3 and C4.

In an effort to compensate for the switching and power supply noise components produced by the first, second and third current sensing transistors T1, T2 and T3, the OCP circuit 320 employs a replica sensing circuit. A first portion of the replica sensing circuit includes replica current sensing transistors T1R and T2R, which generally match the current sense transistors T1 and T2, but sense a reference current $I_{REF}$ rather than the output current of the low-switching transistor LS. The reference current $I_{REF}$ is generated by a current source 342 that is coupled to a third replica transistor T3R. The third replica transistor T3R generally matches the third current sensing transistor T3, and includes a source terminal, at 344, that receives the reference current $I_{REF}$ from the current source 342, and a drain terminal, at 346, that feeds the reference current to a reference current node 348. A fixed power supply 349 provides a fixed DC voltage to a gate terminal 351 of the third replica transistor T3R. The reference current node 348 couples to respective source terminals, at 350 and 352, of the first and second replica transistors T1R and T2R. The reference current node also feeds a second input, at 354, of the differential amplifier 338.

For one embodiment, the replica third current sensing transistor T3R includes a bulk substrate connection, which may be susceptible to power supply noise through parasitic capacitances, indicated by C1R and C2R. Similar noise coupling paths are associated with the power supply 349, and indicated by C3R and C4R. These replica parasitic capacitances closely match the parasitic capacitances C1-C4 that are associated with the third transistor T3 and the differential amplifier 338.

In operation, the DC-DC converter 300 provides a regulated DC voltage to one or more loads 370 coupled to the off-chip smoothing circuit 319. This is accomplished by alternatingly switching the high-switching and low-switching transistors HS and LS in response to the inverted pulse waveforms GATE_HS and GATE_LS. The switching action couples the input voltage $V_{IN}$ to the smoothing circuit 319 in a pulsed fashion to produce the switching voltage $V_P$, which is then smoothed to the desired steady-state DC level through appropriate selection of smoothing inductors and capacitors in the off-chip smoothing circuit 319.

In monitoring the output current of the low-switching transistor LS, the output current sensing circuitry 322 pulls current from the output current node 308 with transistor T1 in response to the GATE_LS pulses, and couples the smoothing circuit 319 to ground with the second transistor T2 in response to the inverted GATE_LS pulses. Similar activity occurs with the replica transistors T1R and T2R.

Further referring to FIG. 3, during operation the first and second sensing transistors T1 and T2 of the output current sensing circuit 322 generate noise in the form of switching noise when turning on and off in response to the gate-fed series of pulses of the waveform GATE_LS. The third current sensing circuit transistor T3 and the differential amplifier 338 also generate noise, but in the form of power supply noise. The switching and power supply noise components generally manifest themselves as superposed noise signal components on the sensed output current. If not properly compensated for, the switching and power supply noise may be amplified by the differential amplifier 338, and potentially distort the current measurement results for the OCP circuit 320.

Like the first, second and third current sensing transistors T1, T2 and T3 of the current sensing circuit 322, the replica transistors T1R, T2R and T3R of the replica current sensing circuit generate replica noise in the form of switching noise and power supply noise components. Since the replica transistors T1R, T2R and T3R are substantially matched to their non-replica counterparts T1, T2 and T3, the replica noise components closely mirror the non-replica noise components. As a result, when fed to the differential inputs 336 and 354 of the differential amplifier 338, the replica and non-replica noise components are canceled as common-mode noise by the differential nature of the differential amplifier.

With the switching and power supply noise components suppressed, the output of the differential amplifier 338 reflects a clean version of a difference signal representing the difference between the sensed output current and the sensed reference current. The clean difference signal may then be fed to an input to the comparator 128 (FIG. 1) for comparison to a predetermined reference level with a level of reliability increased due to the reduction in noise associated with the difference signal. When the reference level is met by the actual measured current, the comparator 128 generates and sends a control signal to the overcurrent monitor 130 to disable or otherwise power down the DC-DC Driver stage 102.

Figure 4:
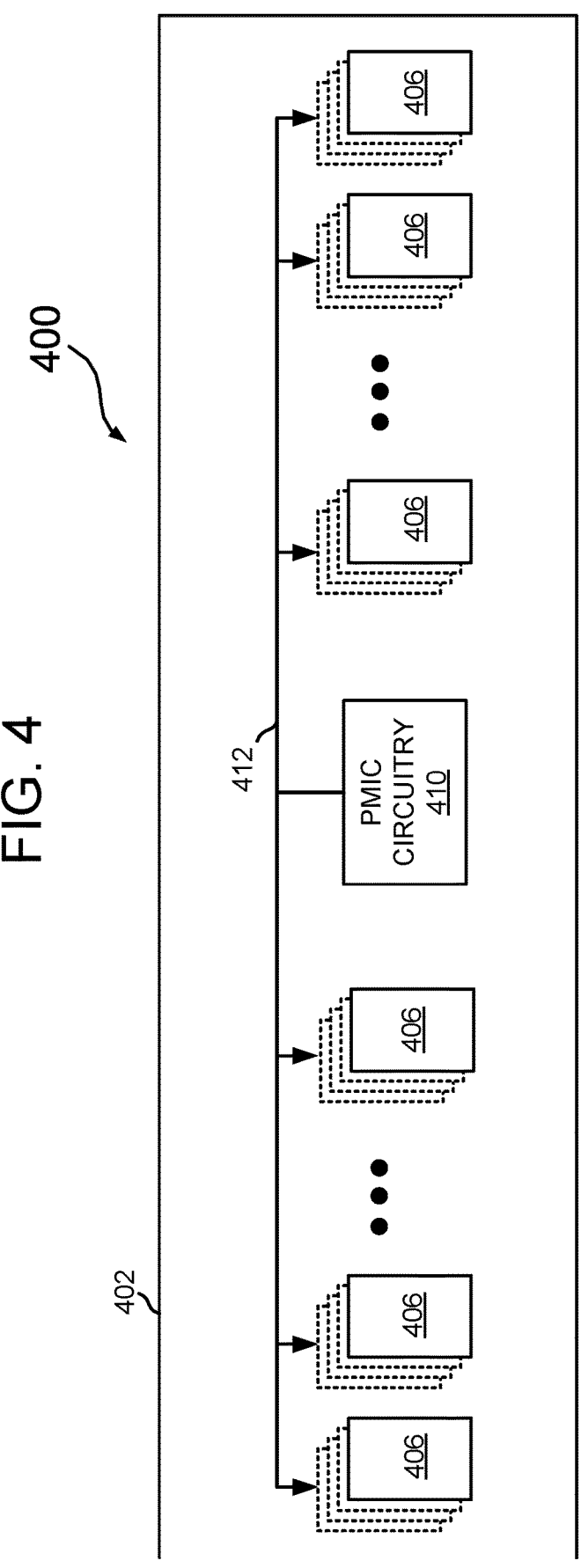
FIG. 4 illustrates one embodiment of a memory module that employs the DC-DC converter of FIG. 1.

Referring now to FIG. 4, for one embodiment, the DC-DC converter 300 lends itself well for use in a power management integrated circuit (PMIC) chip 410 employed on a memory module 400. The memory module 400 generally includes a module substrate 402 that mounts one or more groups of memory devices 406. The PMIC chip 410 couples to the one or more groups of memory devices 406 via a power bus 412 and provides on-module voltage regulation for the memory devices 406. In some embodiments, the PMIC chip may include multiple DC-DC converters for multiple regulated voltages. With improvements in overprotection circuit reliability provided by the embodiments disclosed herein, unnecessary power-downs to the memory module 400 due to noise-related artifacts associated with the DC-DC converter 300 of the PMIC chip 410 may be significantly reduced.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multiconductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A DC/DC converter, comprising:
a sensing circuit comprising active current measurement circuitry to sense an output current of the DC/DC converter;
a reference circuit to generate a reference current to flow along a second path, the reference current for comparison to the output current;
a noise injection circuit coupled to the second path and comprising a replica circuit of the sensing circuit to sense the reference current, the replica circuit comprises replica current measurement circuitry; and
a differential amplifier to reject a common mode noise between the first path and the second path, the common mode noise comprising a switching noise component.

2. The DC/DC converter of claim 1, further comprising:
switching regulator circuitry to generate the output current as a switching current.

3. The DC/DC converter of claim 1, further comprising:
overcurrent protection circuitry to monitor the output current and to disable the DC/DC converter based on an output from the differential amplifier.

4. The DC/DC converter of claim 3, wherein:
the overcurrent protection circuitry comprises comparator circuitry to compare the output from the differential amplifier to a threshold overcurrent value.

5. The DC/DC converter of claim 1, realized as a power management integrated circuit (PMIC) chip.

6. An integrated circuit (IC) chip, comprising:
a switching circuit to generate output current pulses for an off-chip power smoothing circuit;
a first sensing circuit comprising an active noise measurement circuit to generate a first sensing signal during a switch interval, the first sensing signal based on a sensed output current of the switching circuit and comprising a first noise component;
a second sensing circuit comprising a replica active current measurement circuit to sense a reference current from a reference current path and to generate a second sensing signal based on the switched reference current during the switch interval, the second sensing signal comprising a second noise component; and a differential amplifier circuit to receive the first sensing signal and the second sensing signal and to reject the first noise component and the second noise component as common mode noise between the first sensing signal and the second sensing signal, wherein the common mode noise comprises switching noise common to the first noise component and the second noise component.

7. The IC chip of claim 6, further comprising:
overcurrent protection circuitry to monitor the output current pulses and to disable the DC/DC converter based on an output from the differential amplifier.

8. The IC chip of claim 7, wherein:
the overcurrent protection circuitry comprises comparator circuitry to compare the output from the differential amplifier to a threshold overcurrent value.

9. The IC chip of claim 6, realized as a power management integrated circuit (PMIC) chip.

10. The IC chip of claim 6, wherein:
the switching circuit is to generate the output current pulses for a dynamic random access memory (DRAM) power smoothing circuit.

11. A method of operation in a DC-DC converter, the method comprising:
sensing an output current of the DC-DC converter with a sensing circuit via a first path;
flowing a reference current via a second path, the reference current for comparison to the output current;
generating replica noise with a replica sensing circuit;
injecting the replica noise into the second path; and
canceling a power supply coupling noise common to the first path and the second path with a differential amplifier.

12. The method of claim 11, wherein the canceling comprises:
canceling a switching noise common to the first path and the second path.

13. The method of claim 11, further comprising:
monitoring the output current; and
disabling the DC/DC converter based on an output of the differential amplifier.

14. The method of claim 13, further comprising:
comparing the output of the differential amplifier to a threshold overcurrent value to generate a comparison; and
disabling the DC/DC converter based on the comparison.

15. The method of claim 11, further comprising:
operating the DC/DC converter to provide a regulated power supply to memory devices disposed on a memory module.

* * * * *